United States Patent

[11] 3,627,794

[72] Inventors Robert A. Grimm
 Savage;
 Robert C. Slagel, both of Burnsville, Mich.
[21] Appl. No. 10,095
[22] Filed Feb. 16, 1970
[45] Patented Dec. 14, 1971
[73] Assignee Ashland Oil, Inc.
 Ashland, Ky.
 Continuation of application Ser. No.
 544,401, Apr. 22, 1966, now abandoned,
 which is a continuation-in-part of
 application Ser. No. 458,477, May 24,
 1965, now abandoned. This application
 Feb. 16, 1970, Ser. No. 10,095

[54] SULFUR-CONTAINING COMPOUNDS
 17 Claims, No Drawings
[52] U.S. Cl...................................................... 260/402.5,
 260/399, 260/607, 260/608, 260/583
[51] Int. Cl...................................................... C07f 7/22
[50] Field of Search........................................... 260/402.5,
 399, 561, 464, 465.8, 583

[56] References Cited
UNITED STATES PATENTS 2,772,300 11/1956 Wagner........................ 260/399

Primary Examiner—Elbert L. Roberts
Attorneys—Sherman J. Kemmer, William G. Ewert, Cecil C. Schmidt, Larry W. Evans and Plumley, Tyner and Sandt ABSTRACT: A class of bis organo sulfide and disulfide derivatives are provided by the reaction of an ethylenically unsaturated compound with either sulfur monochloride or sulfur dichloride to form the corresponding dichloride diadduct of which the chloro substituents are converted to a variety of other functional groups.

SULFUR-CONTAINING COMPOUNDS

This application is a continuation of application Ser. No. 544,401, filed Apr. 22, 1966, now forfeited, which in turn is a continuation-in-part of application, Ser. No. 458,477, filed May 24, 1965, now abandoned.

This invention relates to novel sulfur-containing compounds and more particularly it relates to high molecular weight functionally substituted diadducts of sulfur-containing radicals.

The compounds of this invention can be represented by the general formula:

XR—Y—RX wherein:
Y is a member of the group of divalent radicals consisting of sulfide and disulfide;
R is a member of the group consisting of alkyl, alkenyl, cycloalkyl anhydride, cycloalkylate, alkylate, and alkenylate, the latter four R groups including the corresponding alkali metal and alkaline earth metal salt derivative moieties and the corresponding carboxyl, amido, and hydrazido derivative moieties;
X is a member of the group consisting of —N=C=O, —N=C=S, —S—C≡N, —NH$_2$, —NHOH, —NHR$_1$, —NR$_1$R$_2$, —NHR$_3$NH$_2$, —NHR$_3$OH, —OOCR$_1$, —OR$_4$, —SR$_5$, —CN and

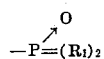

when Y is said sulfide, —Cl when R is said cycloalkyl anhydride or cycloalkylate, and —H when R is said alkenyl or alkenylate with the ethylenic unsaturation therein being located between the carbon atom therein attached to said Y and the next adjacent carbon atom therein;
R$_1$ and R$_2$ are radicals having one to 18 carbon atoms and are members of the group consisting of alkyl, cycloalkyl, and aryl;
R$_3$ is an alkylene radical having one to 18 carbon atoms;
R$_4$ is selected from the group consisting of hydrogen, aryl, and a residue of an acidic alcohol, preferably having two to six carbon atoms, e.g., allyl from allyl alcohol, 4-hydroxy-2-butentyl from cis-2-butene-1,4-diol, or 2,3-dihydroxypropyl from glycerol; and
R$_5$ is a member, preferably having one to eight carbon atoms, selected from the group consisting of alkyl and aryl;
said XR substituent having at least four carbon atoms, and said X and Y being bonded to adjacent carbon atoms in the common R group to which they are attached.

The term "cycloalkyl anhydride" is meant to include any cycloaliphatic radical which contains a dicarboxylic acid anhydride group.

The compounds of this invention generally are oily liquids which are useful as corrosion inhibitors, bacteriostats, emulsifiers, polymer components, and as materials which can be used to extract metal from an aqueous solution of a salt of the metal. For example, certain bis-(aminostearate) sulfides are able to extract copper quickly and efficiently from aqueous solutions of copper salts.

The process by means of which the compounds of this invention are prepared involves, in general, two steps. In the first step, two moles of a monoolefin or diolefin, an unsaturated ester, or an unsaturated anhydride are reacted with 1 mole of sulfur monochloride or sulfur dichloride to produce an intermediate product which can be represented by the general formula shown above, in which X is chlorine. The chlorine-substituted divalent sulfur compounds can therefore be produced in a single step. In the second step of the process, the dichloride diadduct is reacted with a reagent which will convert the chlorine atoms to other groups such as amino or nitrilo groups.

In a preferred mode of operation, a fatty ester, such as ethyl oleate, is dissolved in a suitable solvent, such as anhydrous ether, and is reacted at a temperature of about 0° C. with sulfur dichloride in the absence of light for a period of several hours. After the intermediate product is recovered and purified, it is reacted with ammonia or an alkyl amine at room temperature for several hours to convert the chloride groups to amino groups.

In the first step of the process of this invention, long chain olefins or esters of cyclic or acyclic unsaturated carboxylic acids, particularly the fatty acid esters such as the oleates or the tallow esters, are reacted with sulfur monochloride (S$_2$Cl$_2$) or sulfur dichloride (SCL$_2$), depending upon the nature of the final product desired. In general, the olefins or esters will have from six to 60 carbon atoms per molecule. The preferred olefins are monoolefins having from about eight to 26 carbon atoms. The esters can be mono- or polyesters (e.g., with two to four ester groups) and the preferred esters are monoesters of those monounsaturated fatty acids having from about 12 to 26 carbon atoms. When cyclic unsaturated carboxylic acids are used, those with five to 12 carbon atoms are preferred. When internal olefins are employed, the cis-olefins are preferred. Because of their availability and because the product derived from them usually has better properties than those derived from other starting materials, the commercial oleates are the preferred starting materials. The products which are produced by the process of the present invention occur in different isomeric forms due to the fact that the addition of sulfur and chlorine may occur on either of the two unsaturated carbon atoms in the unsaturated starting material, and since two oleate molecules go to make up one molecule of the intermediate product, the number of isomeric forms is increased even further. However, the physical and chemical properties of these isomers are substantially identical and they may thus be considered as a single compound. All isomers can be formed by the process of this invention.

Among the specific materials which can be employed as starting materials for the process of this invention are olefins such as 1-butene, 1-pentene, 1-hexene, 1-octene, 1-decene, 4-decene, 1-dodecene, 2-dodecene, 7-dodecene, 1-octadecene, 1-docosene, 1-hexacosene, 1,7-octadiene, and the like. Among the unsaturated esters used as starting materials are the monoesters of crotonic acid, undecylenic acid, oleic acid, linoleic acid, linolenic acid, eleostearic acid, palmitoleic acid, petroselenic acid, erucic acid, eliadic acid, Δ$^4$-tetrahydrophthalic acid, nadic acid, and isomers of these acids. Triglycerides of tallow, olive oil, etc. are also useful. These esters are preferably alkyl esters derived from mono- or polyhydric alcohols (e.g., glycerol) having from one to eight carbon atoms, such as methyl sorbate, ethyl decenoate, ethyl myristoleate, propyl palmitoleate, butyl oleate, tallow triglyceride, 1,2-ethanedioleate, and the like, although aryl esters and cycloalkyl esters can be similarly employed. Anhydrides suitable as starting materials include Δ$^4$-tetrahydrophthalic anhydride and nadic anhydride.

Specific compounds within the scope of this invention include, but are not limited to, the following illustrative examples:

1. The bis-(alkylate) sulfides and disulfides
   bis-9(10)-(ethyl-10(9)-aminostearate)sulfide
   bis-9(10)-(ethyl-10(9)-aminostearate)disulfide
   bis-9(10)-(butyl-10(9)-ethylaminostearate)sulfide
   bis-9(10)-(butyl-10(9)-diethylaminostearate)disulfide
   bis-9(10)-(ethyl-10(9)-aminoethyleneaminostearate)sulfide
   bis-9(10)-(methyl-10(9)-hydroxyaminostearate)disulfide
   bis-9(10)-(ethyl-10(9)-ethanolaminostearate)sulfide
   bis-9(10)-(ethyl-10(9)-triethylphosphitostearate)sulfide
   bis-9(10)-[ethyl-10(9)-(2,3-dihydroxypropoxy)stearate]sulfide
   bis-9(10)-(isopropyl-10(9)-allyloxystearate)sulfide
   bis-9(10)-(ethyl-10(9)-octanoyloxystearate)sulfide
   bis-9(10)-(ethyl-10(9)-phenoxystearate)disulfide
   bis-9(10)-(ethyl-10(9)-phenylthiostearate)sulfide
   bis-9(10)-(ethyl-10(9)-isocyanatostearate)sulfide
   bis-9(10)-(ethyl-10(9)-thiocyanatostearate)sulfide
   bis-9(10)-(ethyl-10(9)-isothiocyanatostearate)sulfide
   bis-9(10)-(ethyl-10(9)-p-chlorophenoxystearate)sulfide bis-9(10)-(isopropyl-10(9)-hydroxystearate)sulfide
bis-9(10)-(ethyl-10(9)-tolyloxystearate)sulfide
bis-9(10)-(ethyl-10(9)-butylthiostearate)sulfide
2. The bis-(alkenylate)sulfides and disulfides
   bis-9(10)-(ethyl oleate) sulfide
   bis-9(10)-(ethyl oleate)disulfide
3. The bis-(alkyl)sulfides and disulfides
   bis-1(2)-(2(1)-aminododecane)sulfide
   bis-1(2)-(2(1)-aminododecane)disulfide
   bis-1(2)-(2(1)-ethylaminoeicosane)disulfide
   bis-1(2)-(2(1)-aminoethyleneaminooctane)sulfide
   bis-4(5)-(5(4)-phenoxydecane)sulfide
   bis-4(5)-(-5(4)-hydroxydecane)sulfide
   bis-7(8)-thiocyanatododecane)disulfide
   bis-7(8)-[8(7)-(2,3-dihydroxypropoxy)decane]sulfide
   bis-9(10)-(10(9)-ethylaminooctadecane)sulfide
4. The bis-(alkenyl)sulfides and disulfides
   bis-1(2)-(2(1)-amino-9-decene)sulfide
   bis-1(2)-(2(1)-diethylamino-17-octadecene)sulfide
   bis-1(2)-(2(1)-p-chlorophenylthio-17-octadecene)sulfide
5. The bis-(cycloalkyl anhydride)sulfides and disulfides
   bis-(2-chloro-4,5-dicarboxylic anhydride-cyclohexyl)sulfide
   bis-(2-chloro-4,5-dicarboxylic anhydride-bicyclo(2.2.1)-heptyl)sulfide
6. The bis-(cycloalkylate)sulfides and disulfides
   bis-(2-amino-4,5-dicarbo-n-butoxy cyclohexyl)sulfide
   bis-1(2)-(2(1)-ethylamino-4-carboethoxy cyclohexyl)sulfide The other component of the first step in the process of this invention is a chlorosulfur compound. The specific compounds employed in the process of this invention are sulfur dichloride ($SCl_2$) and sulfur monochloride ($S_2Cl_2$). When 1 mole of one of these sulfur-containing compounds is reacted with 2 moles of an olefin or of a monoester or a polyester described above, the sulfur-containing compound splits to permit one chlorine to attach to an unsaturated carbon atom in one molecule of the olefinic material, the other chlorine to attach to a similar unsaturated carbon atom in the other molecule of the olefinic material, and the sulfur radical, whether it be sulfide or disulfide, to form a bridge between the other two unsaturated adjacent carbons in the two molecules of olefinic material.

The reaction conditions for the first step of the process of this invention are such that the temperatures should be preferably at about 0° C. The reaction is highly exothermic and substantially instantaneous, and accordingly, a higher temperature serves no good purpose, but, to the contrary, causes some increasing amounts of undesirable substitution. However, both higher and lower temperatures will produce the diadducts of the present invention. The reaction is preferably carried out by dissolving the olefinic material in a solvent which, at the reaction conditions, is unreactive toward the sulfur-containing compound. Such solvents include, but are not limited to, ethers, such as diethyl ether, bis-2-methoxyethylether, and 1,2-dimethoxyethane; aliphatic hydrocarbons such as hexane, cyclohexane, and commercial products such as Skelly B and Skelly F; halogenated hydrocarbons, such as chlorobenzene, carbon tetrachloride, chloroform, and the fluorochlorohydrocarbons (such as "Freon"), and the aromatic hydrocarbons, such as benzene, the toluenes, and the xylenes. When the olefinic material is a liquid at the reaction conditions, it is not necessary to include a solvent to facilitate the reaction. Since the materials are somewhat sensitive to photoinitiated side reactions, it is preferable that the reaction be carried out in the dark.

The product produced by the reaction of the olefinic material and the sulfur compound usually is a stable, yellow oil having a slightly sulfurous odor. If the crude product is extracted with an alcohol or other suitable extractant which is reactive toward the sulfur-containing reagents, the odor is considerably reduced.

In the additional modification of the diadduct which is formed in the first step of the reaction, the diadduct is reacted with a suitable reagent which converts the chlorides to other functional groups, such as amines, nitriles, or the like. When the final product is to contain amine groups, the reagent may be any suitable ammonia-releasing agent, alkylamine, dialkylamine, arylamine, diarylamine, or the corresponding diamines. The alkyl, alkylene and aryl groups of these amines contain from one to 18 carbon atoms. Specific examples of such materials are ammonia, hydroxylamine, ethylamine, diethylamine, dibutylamine, aniline, ethylenediamine, ethanolamine, and many other corresponding amino compounds which will be apparent to skilled chemists.

The diadduct formed in the first step of the reaction can be dehydrohalogenated to produce unsaturation and a compound having the formula:

$$XR-Y-RX$$

in which X is hydrogen and XR is an alkenyl or an alkenylate. Dehydrohalogenation removes a hydrogen from the carbon atom that is bonded to the sulfide group or the disulfide group, and it removes the chlorine that is attached to the next adjacent carbon atom. The dehydrohalogenation process is effected by any of several reagents. For example, alkali metal alcoholates, alkali metal hydroxides or tertiary amines can be used for this purpose. It is preferred in some embodiments of this invention to use the alkali metal alcoholate derived from the same alcohol as the alcoholic portion of the original ester starting material; i.e., if ethyl oleate is the starting material, sodium ethoxide is employed for dehydrohalogenation so as to minimize the effect of any interchange between the ester group of the starting material and the alcoholate portion of the reagent. Sodium hydroxide is a suitable reagent, although care must be used to prevent the ester group in the starting material from being saponified to the corresponding acid group. Tertiary amines are also suitable for this purpose, e.g., tributylamine, lutidine, and collidine. In the case of the amines, it is frequently necessary to employ elevated reaction temperatures, over about 100° C., in order to achieve practical reaction rates, while in the case of the alcoholates and the hydroxides, lower temperatures, in the vicinity of room temperature, are adequate. If the metal carboxylates are desired, they can be prepared by conventional routes, e.g., saponification of the carboxylate (provided the X-substituent is stable to hydrolysis) with aqueous hydroxide and either concentration of the resulting hydrolysis solution or metal exchange of the latter with an aqueous solution of a soluble metal salt such as calcium acetate. The carboxylates can also be converted by conventional routes, which will be apparent to those skilled in the art upon being acquainted with this application, to the corresponding derivative amides and hydrazides.

The use of still other reagents will produce different functional groups in the final product, as shown in the following tabulation:

| Desired functional group | Reagent |
|---|---|
| 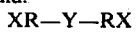—O—C—R | 1. Alkali metal carboxylates such as sodium acetate, sodium octanoate, sodium isooctanoate and potassium pelargonate.<br>2. Alkaline earth carboxylates such as calcium acetate and magnesium butyrate.<br>3. Ammonium carboxylates such as ammonium acetate, triethylammonium acetate, and ammonium butyrate. |
| —CN* | 1. Alkali metal cyanides such as sodium cyanide and potassium cyanide.<br>2. Alkaline earth cyanides such as strontium cyanide.<br>3. Ammonium cyanides such as ammonium cyanide and triethylammonium cyanide. |
| --O---Aryl | 1. Alkali metal aryloxides such as sodium phenoxide, sodium p-chlorophenoxide, and potassium phenoxide.<br>2. Alkaline earth aryloxides such as calcium phenoxide and calcium p-chlorophenoxide.<br>3. Ammonium aryloxides such as ammonium phenoxide, ammonium p-chlorophenoxide, and triethylammonium phenoxide. |

| Desired functional group | Reagent |
|---|---|
| —OH | 1. Water and aqueous solutions of acid acceptors, such as sodium bicarbonate, potassium bicarbonate, ammonium carbonate, calcium carbonate, calcium hydroxide, magnesium carbonate, and magnesium hydroxide. |
| —O—Alkyl | 1. Alcohols, such as cis-2-butene-1,4-diol, allyl alcohol, glycerol, and alkyl glycolate, in the presence of alkali metal bicarbonates, alkaline earth metal carbonates, hydroxides and bicarbonates, and ammonium bicarbonates and carbonates, and preferably in the presence of a co-solvent for the chlorine-containing adduct and the alcohol. |
| —S—Aryl | 1. Alkali metal thioaryloxides such as p-chlorothiophenoxide.<br>2. Alkaline earth thioaryloxides such as calcium thiophenoxide and magnesium p-chlorothiophenoxide.<br>3. Ammonium thioaryloxides such as ammonium phenoxide, triethylammonium phenoxide, and ammonium p-chlorothiophenoxide. |
| —S—Alkyl | 1. Alkali metal thioalkoxides such as sodium thiobutoxide, potassium thioethoxide, and sodium salt of ethyl thioglycolate.<br>2. Alkaline earth thioalkoxides such as calcium thiobutoxide, magnesium thioethoxide, and calcium salt of ethyl thioglycolate.<br>3. Ammonium thioalkoxides such as ammonium thiobutoxide, triethylammonium thioethoxide, and the triethylammonium salt of ethyl thioglycolate. |
| $\overset{O}{\underset{\|}{-P}}-(OR)_2$* | 1. Trialkyl phosphites such as triethyl phosphite, trimethyl phosphite, and tributyl phosphite. |
| —N=C=O | 1. Alkali metal cyanates such as sodium cyanate and potassium cyanate.<br>2. Ammonium cyanates such as ammonium cyanate and triethylammonium cyanate. |
| —N=C=S | 1. Alkali metal thiocyanates such as sodium thiocyanate and potassium thiocyanate.<br>2. Ammonium thiocyanate such as ammonium thiocyanate and triethylammonium thiocyanate. |
| —S—C≡N | Isothiocyanate groups formed on diadducts by heating diadducts containing thiocyanate groups. |

*These two functional groups may be employed in this invention when Y in the general formula is a sulfide, but not when it is a disulfide.

In the special case where diadducts are formed from alphaolefin starting materials and in the second step of the reaction an amine is used as the reagent, it has been found that the resulting product frequently is a mixture of acyclic and cyclic materials. The acyclic material is the bis-(aminoalkyl)sulfide described above. The cyclic material is a substituted thiomorpholine produced by intramolecular condensation. This cyclization product does not occur if some reagent other than an amine is employed in the second step of the reaction.

When ammonia or amines are employed in the preparation of the diadduct of this invention 4 moles of amine per mole of intermediate product are required, although in order to obtain a faster reaction the reagent should be present in large excess over this 4 to 1 ratio. When metal or ammonium salts are employed in place of the amine the ratio of 2 moles of salt per mole of diadduct is sufficient. The reaction preferably takes place when the reactants are dissolved in polar solvents, the amine reagent being used as the solvent if possible, although alcohols and other suitable solvents are entirely satisfactory.

The other reaction conditions are such that the temperature is maintained at about room temperature. Although both higher and lower reaction temperatures can be employed, it is pointed out that at temperatures much lower than room temperature rates of reaction are slower than are desired, and at temperatures much higher than room temperature the formation of byproducts reduces the efficiency of the process. The reaction pressure is normally maintained at about atmospheric, although the use of superatmospheric pressures is desirable for producing faster reactions when the pressure produces a higher concentration of reagent in the reaction solvent. Reaction times are somewhat longer in this step than in the first step of the reaction. In this step, reaction times in the order of 4 to 20 hours are normal, although even longer times may be desirable in certain embodiments of this invention. In some instances it has been preferred, especially when employing ethyl oleate as a starting material, to keep the reaction time under about 20 hours, so as to minimize the tendency for amidolysis to occur.

A better understanding of this invention may be obtained by reference to the following illustrative examples. Parts and percentages are by weight unless otherwise specified and temperatures are expressed in degrees Centigrade unless otherwise indicated.

Example 1

A 500 ml. three-necked round bottom flask and a jacketed addition funnel were covered with aluminum foil so that no light could reach the interior of these pieces of reaction apparatus. To the flask was added a mixture of 50 grams of ethyl oleate (purity greater than 96 percent) and 100 ml. of anhydrous ethyl ether. The contents of the flask were then stirred magnetically and cooled to 0° C. Sulfur dichloride, in the amount of 5.1 ml. and freshly distilled from phosphorous trichloride, was dissolved in 100 ml. of ethyl ether and cooled with a dry-ice bath. The sulfur dichloride solution was then slowly added to the oleate solution. After the addition was complete, the resulting solution was allowed to stand for one-half hour at 0° C. before it was concentrated. The oily concentrate was mixed with sodium bicarbonate, filtered, and then extracted with methanol. The extracted product was further concentrated to produce 54.7 grams of a pale yellow, odorless oil, a yield of 94 percent. The analysis of the product for sulfur, chlorine and molecular weight matched well with theory: Calc.: molecular weight 723.5, % Cl 9.82, % S 4.42; Found: molecular weight 690, % Cl 10.2, % S 4.16, indicating the product to be bis-9(10)-(ethyl-10(9)-chlorostearate)sulfide. This material did not contain any ethyl oleate and appeared homogeneous when analyzed by thin layer chromatography (TLC). Yields in other preparations similar to this one ranged from 86% to 94%, depending on the method of workup.

Example 2

A sample of the sulfide of example 1, 150 grams, was dissolved in 1,000 ml. of ethanol. To the solution was added 200 ml. of concentrated aqueous ammonium hydroxide and the mixture was stirred for about 12 hours. The reaction mixture was then poured into 1,000 ml. of water and the resulting oil extracted twice with ether which was washed twice with water, dried over anhydrous sodium sulfate, filtered, decolorized with charcoal, filtered and concentrated to result in 135.2 grams of a clear, yellow oil. This oil was dissolved in a light petroleum fraction, commercially available as Skelly B, and the resulting solution cooled in an ice bath. Anhydrous hydrogen chloride was passed through the solution until the solution was saturated. The resulting dense oil was shaken with two successive portions of Skelly B to remove non-hydrochloride forming materials from the dense oil. The oil was then shaken with excess 0.5 normal sodium hydroxide and the resulting oil extracted twice with Skelly B. On washing with water, drying and concentration 21.2 grams of bis-9(10)-(ethyl-10(9)-aminostearate)sulfide was obtained. The remainder of the hydrochloride, which was soluble in Skelly B, was recovered by concentrating and/or cooling the solution. The analysis of the product for molecular weight, carbon, hydrogen, sulfur, and nitrogen matched well with theory. Calculated: molecular weight 685, %C 70.0, %H 11.7, %N 4.03, %S 4.67; Found: molecular weight 748, %C 69.4, %H 11.53, %N 3.76, %S 5.0.

The product is useful as a copper extractant and corrosion inhibitor.

Example 3

Into a 3-liter flask covered with aluminum foil and fitted with a foil-covered addition funnel was added 597.2 grams of the ethyl esters of tallow acids (a mixture of myristic, palmitic, stearic, palmitoleic, and oleic acids commercially available as Neofat 65) and the flask was cooled in an ice bath. To the flask was slowly added 30.6 ml. of sulfur dichloride, freshly distilled from phosphorus trichloride and cooled by a mixture of dry ice and isopropyl alcohol. The sulfur dichloride adhering to the walls of the addition funnel was washed off by 5 to 10 ml. of carbon tetrachloride. As the resulting mixture cooled, it began to solidify and was removed from the bath and stirred while it warmed to room temperature.

A solution of 70 grams of ammonia dissolved in 1,500 ml. of absolute ethanol at 25° C. was added to the reaction mixture, and the resulting solution was stirred at room temperature for 16 hours. Large amounts of ammonium chloride had precipitated leaving a clear yellow oil as a supernatant solution. The supernatant was removed by decantation and excess ammonia and ethanol were removed on a rotary evaporator. The oil was suspended in Skelly B and washed with salt water and with tap water in order to remove residual ammonia which would interfere with the use of this product as an extractant of copper from a copper salt solution. The product obtained was the bis-(ethylamino carboxylate) sulfide of the unsaturated acids in the tallow ester.

Example 4

In the same manner as described in example 1, 9.6 ml. of sulfur dichloride in 100 ml. of ethyl ether was added to 50 grams of 1-dodecene dissolved in 100 ml. of ethyl ether while cooling the reaction mixture in an ice bath. Since hydrogen chloride was evolved spontaneously, the reaction mixture was poured into a mixture of 100 ml. of concentrated ammonium hydroxide and 100 ml. of ethanol. After the resulting emulsion had been stirred vigorously for 16 to 17 hours, the stirring was stopped, the reaction mixture was diluted with water, and the resulting supernatant oil was extracted with ethyl ether. The ether extracts were combined, washed with water, dried over sodium sulfate, and concentrated to give a viscous oil, bis-1(2)-(2(1)-aminododecane) sulfide. When this oil was dissolved in Skelly B and shaken with copper sulfate solution a pH 2, copper was extracted into the oily phase coloring it green.

Similarly the diamino-diadduct, bis-1(2)-(2(1)-aminooctane) sulfide, was obtained when 1-octene was employed in place of 1-dodecene in this preparation.

Example 5

Ten grams of bis-9(10)-(ethyl-10(9)-chlorostearate) sulfide, prepared as described in example 1, was dissolved in 200 ml. of ethanol and the resulting solution was cooled at 0° C. To this solution was added 25 ml. of ethylamine and the flask was tightly stoppered. After standing for 27 hours at room temperature, the solution in the flask was diluted with water producing an emulsion which was then extracted with ethyl ether. The ether solution was first washed with 0.5 N sodium hydroxide and then with salt water, and finally was concentrated to 8.8 grams of a cloudy oil. Thin layer chromatography showed that this oil contained some of the chlorostearate sulfide starting material.

The oil was suspended in Skelly B, cooled, and hydrogen chloride was then bubbled through it. The oil which separated as the insoluble hydrochloride was allowed to settle before the clear supernatant was decanted.

The supernatant oil was washed with fresh Skelly B four times, shaken with excess 0.5 N sodium hydroxide, and extracted with ethyl ether. The ether extracts were washed with 0.5 N sodium hydroxide, a salt solution, and finally with tap water until the washes were neutral. The ether extracts were dried, concentrated, and filtered to give a clear yellow oil, free of starting material, having a density of 25° C. of 0.93 g./ml. Infrared analysis showed bands characteristic of a secondary amine. Molecular weights and amine nitrogen analysis agreed well with theory: Calc.: molecular weight 740.5, total amine nitrogen 3.78%; Found: molecular weight 700.0, total amine nitrogen 3.36%. The product was bis-9(10)-(ethyl-10(9)-ethylaminostearate) sulfide. This product is suitable as a corrosion inhibitor.

Example 6

To a solution of 14.2 ml. of diethylamine in 50 ml. of absolute ethanol was added a solution of 10 grams of the diadduct, bis-9(10)-(ethyl-10(9)-chlorostearate) sulfide, in 50 ml. of ethanol. The solution was stirred under nitrogen at room temperature for 16 hours and then added to water, which produced an emulsion. The emulsion was extracted with ethyl ether and the ether extracts were washed with water, dried and concentrated to give 9.2 grams of a yellow oil.

In order to remove small portions of starting material present in the yellow oil, it was dissolved in 100 ml. of Skelly B and anhydrous hydrogen chloride was bubbled through the solution. The tan precipitate which formed was washed four times with Skelly B, mixed with 0.5 N sodium hydroxide, and extracted with ether. The ether extracts were washed with salt water, with tap water, and were dried and concentrated. The orange-red oil product was bis-9(10)-(ethyl-10(9)-diethylaminostearate) sulfide. Infrared spectrum agrees with the expected structure, and elemental analysis agrees well with theory; Calculated: %C 72.3, %H 12.05, %N 3.52, %S 4.02; Found: %C 68.4, %H 11.16, %N 2.45, %S 6.62. The product is suitable as a corrosion inhibitor.

Example 7

A solution of 15 grams of bis-9(10)-(ethyl-10(9)-chlorostearate) sulfide and 13 grams of freshly distilled aniline in 100 ml. of dimethylformamide was stirred at room temperature for 7 days and then poured into water to produce an emulsion which was extracted with ether. The ether extracts were combined and extracted with dilute hydrochloric acid (ca. 1 hydrochloric acid to 10 water), washed with water, dried, and concentrated to a pale yellow oil.

This yellow oil was dissolved in Skelly B and treated with anhydrous hydrogen chloride while the temperature was maintained below 25° C. The resulting hydrochloride was washed three times with Skelly B before it was shaken with ether and with excess 0.5 N sodium hydroxide. The ether extract was washed until it was neutral, dried, concentrated, and filtered to give an orange-brown oil. The infrared spectrum indicates the presence of a secondary amine. Elemental analysis agrees well with theory: Calculated: molecular weight 836.5, %C 74.5, %H 10.5, %N 3.35, %S 3.83; Found molecular weight 771, %C 73.9, %H 10.3, %N 3.08, %S 4.22. The product was bis-9(10)-(ethyl-10(9)-anilinostearate) sulfide. This product is suitable as a corrosion inhibitor.

Example 8

To a solution of 36.4 grams of ethylene diamine in 150 ml. of absolute ethanol there was added a solution of 39.0 grams of bis-9(10)-(ethyl-10(9)-chlorostearate) sulfide in 50 ml. of ethanol. The mixture was not homogeneous at first, but it became so after stirring at room temperature for 30 minutes. After 17 hours, the stirring was stopped, the solution was mixed with twice its volume of water, and the resulting emulsion was extracted with ethyl ether. The ether extracts were washed with water until it was noted that emulsions formed as the solution became less alkaline. Subsequent washings were with salt water. The ether extracts were dried and concentrated to give 40.0 grams of a viscous yellow oil.

To purify the crude product, the oil was dissolved in Skelly B and anhydrous hydrogen chloride was bubbled through it. The heavy crystalline precipitate was washed with Skelly B, and was shaken with 0.5 N sodium hydroxide. The resulting emulsion was extracted with ethyl ether and the ether extracts were dried and concentrated to a yellow oil. The infrared spectrum shows bands characteristic of primary amines. Analysis shows total amine nitrogen to be 6.33% and shows the elemental analysis to agree well with theory: Calculated: molecular weight 770.5 %C 68.5, %H 11.68, %N 7.27, %S 4.15; Found: molecular weight 805, %C 66.0, %H 11.4, %N 7.18, %S 4.92. The product was bis-9(10)-(ethyl-10(9)-aminoethyleneaminostearate) sulfide and is useful as a copper extractant, corrosion inhibitor and emulsifier.

Example 9

A solution of 152 grams of ethyl oleate, 453 grams of ethyl ether, and 32.5 grams of sulfur monochloride was allowed to stand for 8 days in a flask covered with aluminum foil. During this time the solution was heated under reflux (35° C.) for a total of about 10 hours. The resulting yellow solution was washed with water, sodium bicarbonate solution, and salt water until it was neutral. The solution was dried and concentrated to give 171 grams of a yellow oil having a faint fatty odor. Elemental analysis and molecular weight determinations agree well with theory: Calculated: molecular weight 755.5, %Cl 9.40, %S 8.47; Found: molecular weight 663, %Cl 8.9, %S 9.0.

A portion of the above oil (21.6 grams) was stirred with 400 ml. of an ethanolic solution of ammonia (saturated at 25° C.) for 16 hours. The solution was then poured into water and the resulting oil extracted with ether. The ether extracts were dried and concentrated. The resulting oil was bis-9(10)-(ethyl-10(9)-aminostearate) disulfide.

The above oil, dissolved in a mixture of Skelly B/ethyl acetate (ca. 75/25), extracted copper from a 0.0315 M solution of copper sulfate at pH 2 to form a blue-green solution.

Example 10

A solution of 5.2 grams of bis-9(10)-(ethyl-10(9)-chlorostearate) sulfide in 50 ml. of ethanol was mixed with a solution of 0.5 gram of sodium cyanide in 50 ml. of ethanol. The resulting solution was stirred at room temperature for about 20 hours. After 1½ hours, the solution became cloudy due to the precipitation of the less soluble sodium chloride.

The reaction mixture was filtered and mixed with water. The resulting oil was extracted with ethyl ether and the ether solution was thoroughly washed with water to remove residual cyanide ion to produce 4.8 grams of yellow oil as a product. The yellow oil was compatible with polyvinyl chloride and exhibited a nitrile absorption in the infrared. The product was bis-9(10)-(ethyl-10(9)-cyanostearate) sulfide.

Example 11

A solution was prepared by dissolving 5.0 grams of bis-9(10)-(ethyl-10(9)-chlorostearate) sulfide in 20 ml. of ethyl ether. To this solution, while it was being stirred, there was added dropwise 3.6 grams of butylamine dissolved in 20 ml. of ethyl ether. The resulting solution was allowed to stand at room temperature for 1 hour. The ether was then refluxed by placing in a warm water bath for 2 hours, following which the solution was allowed to stand overnight at room temperature. The solution was then heated in a warm water bath to boil off the ether. Before all of the ether was vaporized, 40 ml. of dimethyl-formamide was added and the resulting solution heated in a mineral oil bath at 110° C. for 2 hours. The solution was then poured into water to remove dibutylamine, dibutylamine hydrochloride, and dimethylformamide. An orange layer, which appeared on top of the water, was removed, suspended in ether, decolorized, and dried to give the product, bis-9(10)-(ethyl-10(9)-butylaminostearate) sulfide, which is useful as a corrosion inhibitor.

Example 12

A solution was prepared by dissolving 5.0 grams of bis-9(10)-(ethyl-10(9)-chlorostearate) sulfide in 30 ml. of ethanol. A second solution containing 0.32 gram of sodium ethoxide dissolved in 10 ml. of ethanol was then added with stirring to the first solution. The sodium chloride that formed (0.65 gram, 80% theoretical) was filtered out. The filtrate solution was then poured into water and the oil extracted. The extract was washed until neutral, dried and concentrated to 4.13 grams of a mobile oil that contained sulfur but was free of chlorine. Infrared analysis indicated the presence of ethylenic unsaturation. The product was bis-9(10)-(ethyl oleate) sulfide.

Similar results are obtained when other bases are used in place of sodium ethoxide, e.g., sodium methoxide, sodium hydroxide and nitrogen bases having a boiling point above about 100° C., e.g., tertiary amines and pyridine derivatives such as lutidine. Furthermore, even in the absence of a base dehydrohalogenation can be effected by heating the composition to a temperature of about 200° C.

Example 13

To a solution of 30.5 grams (0.2 mole) of tetrahydrophthalic anhydride in 450 ml. of dry benzene was added 12 grams (0.12 mole) of freshly distilled sulfur dichloride dropwise. The resulting mixture, which warmed during the addition, was allowed to stir at ambient temperature for 2 hours and then refluxed for 2 hours before cooling. A white solid precipitated out. The solid, 34 grams, was found to have a melting point of 192°-193° C. The product was identified as bis(2-chloro-4,5-dicarboxylic anhydride-cyclohexyl) sulfide, $C_{16}H_{16}Cl_2O_6S$: Calculated: %C 47.18, %H 3.97, %Cl 17.41, %S 7.87; Found: %C 45.41, %H 3.87, %Cl 16.75, %S 9.40.

Example 14

A solution of 3.5 grams of bis-9(10)-(ethyl-10(9)-chlorostearate) sulfide in 100 ml. of dry acetonitrile was prepared. To this solution was added 1 gram of finely powdered potassium cyanate and the resulting mixture was stirred at room temperature in a stoppered flask. The potassium cyanate did not completely dissolve in the mixture. After 4 days an oil had deposited on the walls and bottom of the flask. Acetonitrile was removed by heating the contents of the flask under vacuum, and the remaining oil was dissolved in ether. The ether solution was freed of suspended salts by centrifugation and then concentrated to a pale yellow oil. This concentrated oil was heated and filtered through a fritted glass funnel to give 2.60 grams of product, which upon infrared analysis exhibited strong absorption bands at 2,260 cm.$^{-1}$ and 1,625 cm.$^{-1}$ which are typical of isocyanates. The product was bis-9(10)-(ethyl 10(9)-isocyanatostearate) sulfide. This compound is useful in the preparation of polyurethanes.

Example 15

An emulsion was prepared by dissolving 14 grams of potassium thiocyanate in 200 ml. of dimethylformamide and adding 50 grams of bis-9(10)-(butyl-10(9)-chlorostearate) sulfide. The resulting emulsion was stirred overnight at room temperature with no apparent reaction taking place. In order to provide better solubility between the two phases, 100 ml. of ethanol was added and the next day the mixture was filtered and the ethanol removed on a rotary evaporator. The remaining solution was then extracted eight times with Skelly B. The extraction solutions of Skelly B were concentrated under vacuum to give 42.7 grams of reddish oil which upon infrared analysis exhibited a sharp absorption peak at 2,150 cm.$^{-1}$ (typical of thiocyanates) and a broad band with a peak at 2,050 cm.$^{-1}$ (typical of isothiocyanates). This product was principally bis-9(10)-(butyl-10(9)-thiocyanatostearate) sulfide. This compound is useful as an insecticide.

After the foregoing product was heated to 120° C. overnight, infrared analysis indicated no absorption at 2,150 cm.$^{-1}$ and a very strong absorption at 2,050 cm.$^{-1}$. This change indicates the rearrangement of the thiocyanate groups to isothiocyanate groups resulting in the product, bis-9(10)-(butyl-10(9)-isothiocyanatostearate) sulfide. This compound is useful as a monomer in the preparation of polyurethanes.

Example 16

To a solution of 50 grams of bis-9(10)-(ethyl-10(9)-chlorostearate) sulfide in 250 ml. of ethanol there was added 61 grams of redistilled ethanolamine. This cloudy mixture was stirred at room temperature for one-half hour and became clear. After standing overnight, the reaction mixture was poured into water and the resulting emulsion was extracted with a hydrocarbon fraction (Skelly B). The extract was washed first with sodium hydroxide and then with water and finally was dried and concentrated to a pale yellow oil which was principally bis-9(10)-(ethyl-10(9)-hydroxyethyleneaminostearate) sulfide in an excellent yield.

Example 17

Bis-(isopropyl-β-chlorostearate)-sulfide (100 grams) was mixed with saturated sodium bicarbonate solution (1 liter). The mixture was vigorously stirred and heated under reflux for 12 hours. The mixture was allowed to cool and the hydrocarbon portion was separated from the aqueous portion of the reaction mixture. The hydrocarbon portion was dissolved in ether, washed twice with water, dried over sodium sulfate and concentrated to a pale yellow oil that slowly crystallized. The crystalline product was established as bis-(isopropyl-β-hydroxystearate) sulfide by molecular weight, hydroxyl value, saponification value, acid value, and elemental analyses. The α-naphthyl urethane derivative of this product was prepared by heating α-naphthylisocyanate with said product at 100° C.

A sample of said sulfide product was also hydrolyzed to give a brown-yellow glass, established as bis-(hydroxystearic acid)-sulfide by hydroxyl and acid value analyses. The potassium salt of this acid was made by titrating an ethanolic solution of the acid with potassium hydroxide. The lithium and sodium salts were prepared similarly. Salts of said acid, such as the calcium salt, were prepared by slowly adding a solution of the potassium (or lithium or sodium) salt to an aqueous solution of a calcium salt. Barium, strontium and other water-insoluble salts of said acid also can be prepared in this manner.

Example 18

Bis-(isopropyl-β-chlorostearate)sulfide (30 grams) was added to distilled water (300 ml. and the mixture was stirred vigorously and heated under reflux. After about 16 hours, the aqueous phase was acidic to pH paper so it was decanted off and replaced with fresh water. After another 16 hours of heating and stirring, the mixture was allowed to cool and the hydrocarbon phase was dissolved in ether. The ether solution was washed with water twice, then was dried over sodium sulfate and concentrated to a pale yellow oil, established by hydroxyl, saponification, and acid value analyses as bis-(isopropyl-β-hydroxystearate) sulfide.

Example 19

Bis-(isopropyl chlorostearate)sulfide (20 grams) was mixed with glycerol (70 ml.), t-butyl alcohol (300 ml.) and sodium bicarbonate (4 grams). The pearlescent suspension was heated to 50° C. After 36 hours, the reaction mixture was filtered to remove salts and the t-butyl alcohol was removed under vacuum. Upon removal of the t-butyl alcohol, the reaction mixture separated into a glycerol layer and a product layer. The product layer was separated and dissolved in ether. The ether solution was washed three times with water, then was dried over sodium sulfate and finally concentrated to a pale yellow oil, established as bis-[isopropyl-(2,3-dihydroxypropoxy)-stearate]sulfide by hydroxyl value and infrared analyses.

Example 20

Bis-(isopropyl-chlorostearate)sulfide (17 grams) was mixed with 2-butene-1,4-diol (50 ml.), dimethylformamide (50 grams) and sodium bicarbonate (2 grams). The mixture was stirred and heated for about 36 hours. When the stirring was stopped, the mixture separated into two layers. The upper was separated, dissolved in ether, the ether solution washed with water, dried and concentrated to a yellow oil, established by nuclear magnetic reasonance, infrared spectrum and hydroxyl value analyses as bis-[isopropyl-(4-hydroxy-2-butenoxy)stearate]sulfide.

The foregoing examples and disclosure are intended to be illustrative and descriptive and not to be restrictive. The procedures set forth in the foregoing examples are similarly applicable to other olefinic materials included within the scope of the present invention. The dichloro diadduct may similarly be further reacted in the ways illustrated with amines and salts not specifically illustrated in the examples but included within the scope of the present invention. Many variations and different embodiments of the described invention will be apparent to those skilled in the art.

What is claimed is:

1. A compound having the formula:

XR—Y—RX wherein: Y is a member of the group of divalent radicals consisting of sulfide and disulfide; R contains from four to 60 carbon atoms, and is a member of the group consisting of saturated and unsaturated fatty acid acylate and the alkali metal, alkaline earth metal, carboxyl, amido, and hydrazido derivatives of saturated and unsaturated fatty acid acylate; X is a member of the group consisting of —NH$_2$, —NHOH, —NHR$_1$, —NR$_1$R$_B{}_l{}'$ —NHR$_3$NH$_2$, and —NHR$_3$OH; R$_1$ and R$_2$ contain from one to 18 carbon atoms, and are members selected from the group consisting of alkyl and phenyl; and R$_3$ is an alkylene having from one to 18 carbon atoms; each of said X and Y being bonded to adjacent carbon atoms in the R group to which they are commonly attached.

2. The compound of claim 1 wherein R is obtained from monoesters of monounsaturated fatty acids having from about 12 to 26 carbon atoms.

3. The compound of claim 1 wherein both R's are obtained from monoester of monounsaturated fatty acids having from about 12 to 26 carbon atoms; and both X's are —NH$_2$.

4. The compound of claim 1 wherein both XR— groups are ethyl 10(9)-aminostearate, ethyl 10(9)-ethylaminostearate, ethyl 10(9)-diethylaminostearate, ethyl 10(9)-aminoethyleneaminostearate, or ethyl 10-(9)-hydroxyethyleneaminostearate, and both said XR— groups are bonded to the sulfur through the 9(10) position.

5. The compound of claim 1 which is bis-9(10)-(ethyl-10 (9)-aminostearate) sulfide.

6. The process of preparing the compound of claim 1 which comprises reacting at a temperature of about 0° C., and in the substantial absence of light, esters of ethylenically unsaturated fatty acids having from 12 to 26 carbon atoms, with a compound selected from the class consisting of sulfur monochloride and sulfur dichloride, reacting the resultant intermediate product mixture at about room temperature with a reagent selected from the class consisting of ammonia, ammonia-releasing compound, and an amino compound, and recovering the compound of claim 1.

7. A compound having the formula:

XR—Y—RX wherein: Y is a member of the group of divalent radicals consisting of sulfide and disulfide; R contains from four to 60 carbon atoms, and is a member of the group consisting of saturated and unsaturated fatty acid acylate, and the alkali metal, alkaline earth metal, carboxyl, amido, and hydrazido derivatives of saturated and unsaturated fatty acid acylate; X is a member of the group consisting of —N=C=O, —N=C=S, S—C≡N; also —CN when Y is sulfide; each of said X and Y being bonded to adjacent carbon atoms in the R group to which they are commonly attached.

8. The compound of claim 7 wherein both R's are obtained from monoesters of monounsaturated fatty acids having from about 12 to 26 carbon atoms.

9. The compound of claim 7 wherein both XR— groups are selected from the group consisting of ethyl-10(9)-isocyanatostearate, ethyl-10(9)-isothiocyanatostearate, and ethyl-10(9)-cyanostearate, and both said XR— groups are bonded to the sulfur through the 9(10) position.

10. The process of preparing the compound of claim 7 which comprises reacting at a temperature of about 0° C. and in the substantial absence of light, esters of ethylenically unsaturated fatty acids having from 12 to 26 carbon atoms, with a compound selected from the class consisting of sulfur monochloride and sulfur dichloride, reacting the resultant intermediate product mixture at about room temperature with a reagent selected from the group consisting of alkali metal cyanide, alkaline earth cyanide, ammonium cyanide, alkali metal cyanate, ammonium cyanate, alkali metal thiocyanate, and ammonium cyanate, and recovering the compound of claim 7.

11. A compound having the formula:

XR—Y—RX wherein Y is the divalent sulfide radical; R contains from four to 60 carbon atoms, and is a member of the group consisting of saturated and unsaturated fatty acid acylate, and the alkali metal, alkaline earth metal, carboxyl, amido, and hydrazido derivatives of saturated and unsaturated fatty acid acylate;

$$X \text{ is} - \overset{O}{\underset{|}{P}}[OR_7]_2$$

R$_7$ contains from one to 18 carbon atoms, and is alkyl; each of said X and Y being bonded to adjacent carbon atoms in the R group to which they are commonly attached.

12. The process of preparing the compound of claim 11 which comprises reacting at a temperature about 0° C., and in the substantial absence of light, esters of ethylenically unsaturated fatty acids having from 12 to 26 carbon atoms, with a compound selected from the group consisting of sulfur monochloride and sulfur dichloride, reacting the resultant intermediate product mixture at about room temperature with a trialkyl phosphate.

13. A compound having the formula:

XR—Y—RX wherein: Y is a member of the group of divalent radicals consisting of sulfide and disulfide; R contains from four to 60 carbon atoms, and is a member of the group consisting of saturated and unsaturated fatty acid acylate, and the alkali metal, alkaline earth metal, carboxyl, amido, and hydrazido derivatives of saturated and unsaturated fatty acid acylate; X is a member of the group consisting of —OOCR$_6$, —OR$_4$ and —SR$_5$; R$_6$ contains from one to 18 carbon atoms, and is alkyl; R$_4$ is a member selected from the group consisting of hydrogen, phenyl, chlorophenyl, methyl substituted phenyl, allyl, 4-hydroxy-2-butentyl, and 2,3-dihydroxypropyl and R$_5$ is a member selected from the group consisting of alkyl having from one to eight carbon atoms, phenyl, and chlorophenyl; each of said X and Y being bonded to adjacent carbon atoms in the R group to which they are commonly attached.

14. The compound of claim 13 wherein both R's are obtained from monoesters of monounsaturated fatty acids having from 12 to 26 carbon atoms.

15. The compound of claim 13 wherein both XR— groups are ethyl-10(()-hydroxystearate or ethyl-10(9)-[2,3-dihydroxypropoxy] stearate and both said XR— groups are bonded to the sulfur through the 9(10) position.

16. The process of preparing the compound of claim 14 which comprises reacting at a temperature of about 0° C., and in the substantial absence of light, esters of ethylenically unsaturated fatty acids having from 12 to 26 carbon atoms, with a compound selected from the class consisting of sulfur monochloride and sulfur dichloride, reacting the resulting intermediate product mixture at about room temperature with a reagent selected from the group consisting of alkali metal alcoholate, alkali metal hydroxide, alkali metal carboxylate, alkaline earth carboxylate, ammonium carboxylate, water, aqueous alkali metal bicarbonate, alkaline earth metal carbonate, alkaline earth metal bicarbonate, alkaline earth metal hydroxide, ammonium carbonate, alkali metal aryloxide, alkaline earth metal aryloxide, ammonium aryloxide, alkali metal salt of electronegatively substituted alcohol, alkaline earth metal salt of electronegatively substituted alcohol, ammonium salt of electronegatively substituted alcohol, alkali metal thioaryloxide, alkaline earth metal thioaryloxide, ammonium thioaryloxide, alkali metal thioalkoxide, alkaline earth metal thioalkoxide, ammonium thioalkoxide, and recovering the compound of claim 13.

17. A compound having the formula:

XR—Y—RX wherein: Y is a member of the group of divalent radicals consisting of sulfide and disulfide; R contains from four to 60 carbon atoms, and is unsaturated fatty acid acylate, with ethylenic unsaturation located between the carbon atom therein attached to Y and the next adjacent carbon atom therein; X is —H; each of said X and Y being bonded to adjacent carbon atoms in the R group to which they are commonly attached.

* * * * *